United States Patent [19]

Bushaw et al.

[11] Patent Number: 4,463,417

[45] Date of Patent: Jul. 31, 1984

[54] MODULAR, PROCESSOR-CONTROLLED DOCUMENT DISTRIBUTION TERMINAL

[75] Inventors: Kenneth A. Bushaw, Longmont; William I. Branson, Boulder; Ted A. Rehage; Frankie S. Shook, both of Longmont, all of Colo.

[73] Assignee: International Business Machines Corporation, Armonk, N.Y.

[21] Appl. No.: 220,635

[22] Filed: Dec. 29, 1980

[51] Int. Cl.³ .............................. G06F 7/00; G06F 9/00
[52] U.S. Cl. .................................................. 364/200
[58] Field of Search ... 364/200 MS File, 900 MS File

[56] References Cited

U.S. PATENT DOCUMENTS 4,188,668  2/1980  Finlay ................................. 364/900

OTHER PUBLICATIONS

Gregg, W. D., Analog & Digital Communication, John Wiley & Sons, N.Y., 1977, pp. 441-445,494,505,506,522.

*Primary Examiner*—Felix D. Gruber
*Assistant Examiner*—John G. Mills
*Attorney, Agent, or Firm*—Homer L. Knearl

[57] ABSTRACT

A document distribution terminal is organized with two supervisory processing units, one to control the data entry and data printing and the other to control the terminal. Each of these processing units only performs control functions. All of the data processing is performed by various specialized devices preparing the document data for transmission or for printing. Further, the terminal is organized with two interfaces and an adapter coupling the two interfaces. The terminal-controlling processing unit supervises one interface that interconnects all of the specialized devices. The other processing unit, that controls the data entry and data printing devices, supervises the second interface. Once the supervisory processing units have set up a job in the terminal, the data transfer across the two interfaces is substantially under the control of logic in the adapter.

9 Claims, 15 Drawing Figures

MODULAR, PROCESSOR-CONTROLLED DOCUMENT DISTRIBUTION TERMINAL

DESCRIPTION

FIELD OF THE INVENTION

This invention relates to stored program control of document distribution terminal utilizing multiple data processing units. More particularly the invention relates to the terminal architecture whereby multiple microprocessors may interface to supervise the three basic document distribution functions, scan or data entry, print and communicate.

BACKGROUND ART AND RELATED APPLICATION

In document distribution systems, the document to be transmitted is converted to millions of data bits per page. Document distribution systems may use coded information (CI) or non-coded information (NCI) to electronically transmit the document image. Whether the data is CI or NCI, it must be processed before it is transmitted. Processing may include data compression to reduce transmission time and data encryption for security purposes. Processing millions of data bits with a central processor to achieve these functions is wasteful and time-consuming.

It is much more efficient to use specialized peripheral devices working in parallel to perform the scan, compress, encrypt, transmit, receive, decrypt, decompress and print operations. An example of such a system is described in copending commonly-assigned patent application, Ser. No. 220,637, filed Dec. 29, 1980, now U.S. Pat. No. 4,454,575 entitled Shared Peripheral Processing System by K. A. Bushaw et al. In the Bushaw et al application, there is a supervisory processing unit to control the system and the peripheral devices, and there is a data processing unit or logic circuits in each peripheral device to process the data. This works well but lacks flexibility in configuring the terminal as a stand-alone scanner or printer separate from the peripheral devices performing the communication functions because each stand-alone box requires a supervisory processor.

Two processing units with time shared access to multiple peripheral devices is taught in U.S. Pat. No. 3,560,937 issued to R. P. Fischer on Feb. 2, 1971. However, the data is processed by the two processing units and not the peripheral devices. Further there is no intent to be able to reconfigure the system with some of the peripheral devices standing alone with their own processing unit separate from a systems processing unit.

In facsimile apparatus it is known to use a central processing unit to operate a facsimile terminal. Two examples are the R. E. Wernikoff et al U.S. Pat. No. 3,751,582 and the D. A. Perreault et al U.S. Pat. No. 3,914,537. Both of these patents use a single processor. Accordingly it would not be possible to breakoff stand-alone printers or stand-alone scanners from the communications apparatus because all these devices share one processing unit.

SUMMARY OF THE INVENTION

It is the object of this invention to provide flexibility in the configuration of a processor controlled document distribution terminal whereby the data entry (or scan), print and communication functions may be stand-alone modules.

In accordance with this invention the above object is accomplished by splitting the document distribution terminal into a communication module and a scanner/printer module. Each of the modules has its own supervisory processor. All of the data processing is performed by specialized peripheral devices preparing the video data for transmission or printing. These peripheral devices are set up for a job by the system supervisory processor in the communication module. The scanning and printing apparatus in the scanner/printer module is controlled by a scanner/printer processor in the module. An I/O adapter couples control information and video data between the communication module and the scanner/printer module. The adapter operates in either a supervisory mode or an automatic mode. In the supervisory mode, control information is exchanged by the system processor and the scanner/printer processor to set up a job. In the automatic mode, video data transfer is controlled by the adapter as the data is processed by the scanning or printing apparatus and the communication peripheral devices.

DETAILED DESCRIPTION

Figure 1:
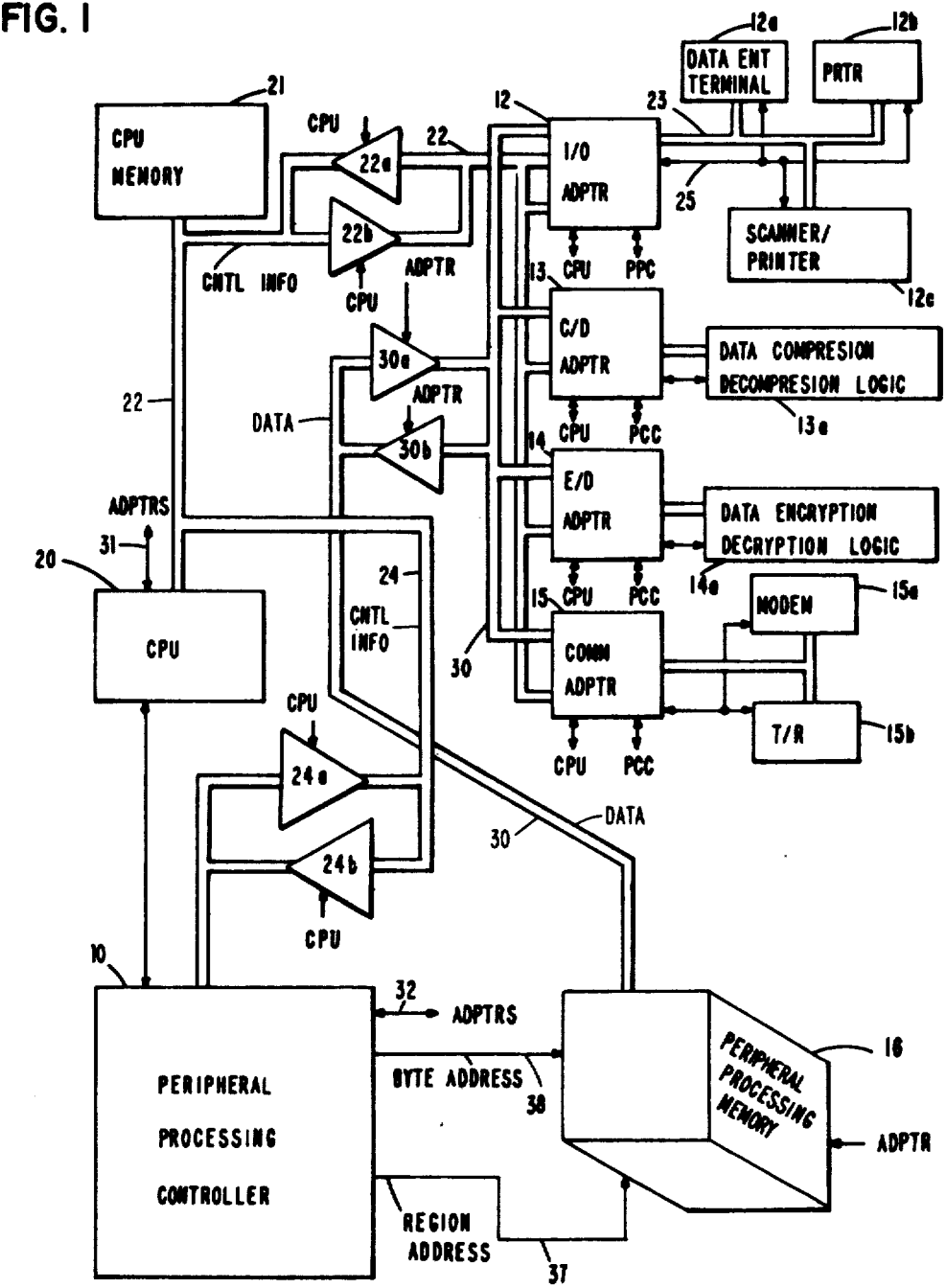
FIG. 1 shows a document distribution terminal wherein all the data is processed by the peripheral devices.

In FIG. 1, controller 10 and peripheral adapters 12, 13, 14, and 15 are initialized by Central Processing Unit (CPU) 20. Thereafter, adapters 12-15 with their peripheral devices (indicated by the same reference numeral as the adapters except for letter suffixes) operate simultaneously to process data directly with the peripheral processing memory 16. Controller 10 contains a plurality of memory address registers (MAR's), end-of-block logic and priority logic for controlling shared use of peripheral memory 16 by devices 12a-c, 13a, 14a, 15a-b.

CPU 20 with its memory 21 supervises the operation of the system. It does not directly process the data in the peripheral system. The CPU sends and receives control information to and from the peripheral adapters over bidirectional bus 22 using drivers 22a and 22b to steer the information flow. Similarly, CPU 20 sends and receives control information to and from peripheral processing controller 10 over bidirectional bus 24 using drivers 24a and 24b to steer the information flow. The control information includes address data, status information, commands, control bits, mode information, etc; it does not include data processed by the peripheral devices 12a-c, 13a, 14a and 15a-b.

In FIG. 1 control buses 22 and 24 and data bus 30 represent information channels which are address controlled. The single lines represent hardwired control or address lines and may represent more than one such line. For example, CPU 20 can send control information to controller 10 or adapters 12-15 over buses 22 and 24 by addressing the information to registers in the controller or the adapters. The single line from the controller 10 and the adapters (ADPTRS) represent multiple signal lines such as request, grant and end-of-block. Similarly address lines 37 and 38 are multiple address lines.

In operation, CPU 20 responds to interrupts from the peripheral devices. Using control bus 24 and signal lines 31, CPU 20 sets up MARs in controller 10 with start addresses for a peripheral data processing job. Based on the job to be performed, each device uses a preassigned MAR or is assigned a MAR by CPU 20 over control bus 22. Then CPU 20 releases the peripheral adapters and their peripheral devices to perform their assigned peripheral jobs.

When each peripheral device is ready to process data it requests via a signal line 32 that controller 10 grant it access to peripheral memory 16. Controller 10 grants it access based on predetermined priority logic in the controller. The grant commands are passed back to the peripheral adapters over signal lines 32.

If a peripheral device is granted access, it sends a MAR select and enable signal over lines 32 to activate its assigned MAR in controller 10. Also, it sends a Read/Write command to drivers 30a and 30b and to peripheral processing memory 16 to steer the data flow over data bus 30 from or to memory 16. The peripheral device having access then reads or writes data in peripheral memory 16 over data bus 30.

The MAR Enable and MAR Select signals specifiy the MAR assigned to the peripheral device. The assigned MAR contains the address of the data in peripheral memory 16 that is to be processed by the peripheral device. The address consists of two portions, a region address and a byte address. The region address is passed by region address lines 37 to PPM 16. The byte address is passed by lines 38 and identifies the specific storage location within a region of memory that contains the byte of data to be accessed by the peripheral device.

Each peripheral device processes the data in memory at the address provided by its assigned MAR. Each time device 12a-c, 13a, 14a, 15a or 15b accesses the memory, the address in its MAR is incremented by one so that the device may work its way through a block of data stored in peripheral processing memory 16. After each access, the requesting device with the highest priority is granted the next access by the controller. A peripheral device will keep requesting access to PPM 16 until it gets enough data to process. Thus, the peripheral devices are processing data simultaneously within themselves and are time-sharing access to PPM 16.

The addressing of a block of data in memory 16 is monitored by end-of-block logic in controller 10 so that it knows when a peripheral device has finished processing its assigned data block. The end-of-block conditions are loaded into the controller 10 over the control bus 24 by CPU 20 when the periheral device job is initialized. The conditions may be the size of the block or the number of accesses by a given peripheral device. When controller 10 detects the end-of-block, it notifies the peripheral device through its adapter with an EOB command. The peripheral device in turn sends an INTERRUPT to CPU 20. This tells the CPU that the peripheral device has completed its assigned job.

Alternatively, if initialized to do so, the peripheral device may simply proceed to another job.

The shared peripheral-processing system shown in FIG. 1 is a document distribution system. Input/Output adapter 12 connects a data entry module 12a, a printer module 12b or a scanner/printer module 12c to the the system. Bus 23 carries the video data and control commands. Signal lines 25 are hardwired and carry control signals between the modules and the I/O adapter. Each of the modules would preferably contain a microprocessor to supervise the print, scan or data entry function. Data entry refers to such functions as card reading, tape reading, optical character reading or keyboard data entry.

The C/D adapter 13 connects data compression or decompression logic 13a to the system. Similarly, E/D adapter 14 connects data encryption or decryption logic 14a to the facsimile system. The compression or encryption functions may be accomplished with any number of algorithms using hardwired logic or microprocessors.

The communication adapter 15 connects the system to one of several communication links. The communication links are represented by modem 15a and transmitter/receiver 15b. Typically the modem will be used to communicate over telephone lines while the transceiver might be used in a satellite communication network.

When initializing this shared peripheral-processing system, CPU 20 can configure the facsimile system to perform multiple peripheral jobs. For example, the system can be initialized in one configuration as a scanner, data compressor, data encryptor, and data transmitter. Then facsimile scan data will be processed through peripheral memory 16 in pipeline fashion. In another configuration the system can be initialized as a receiver, data decryptor, data decompressor and printer. In this configuration facsimile print data is processed through peripheral memory 16 in pipeline fashion.

Figure 2:
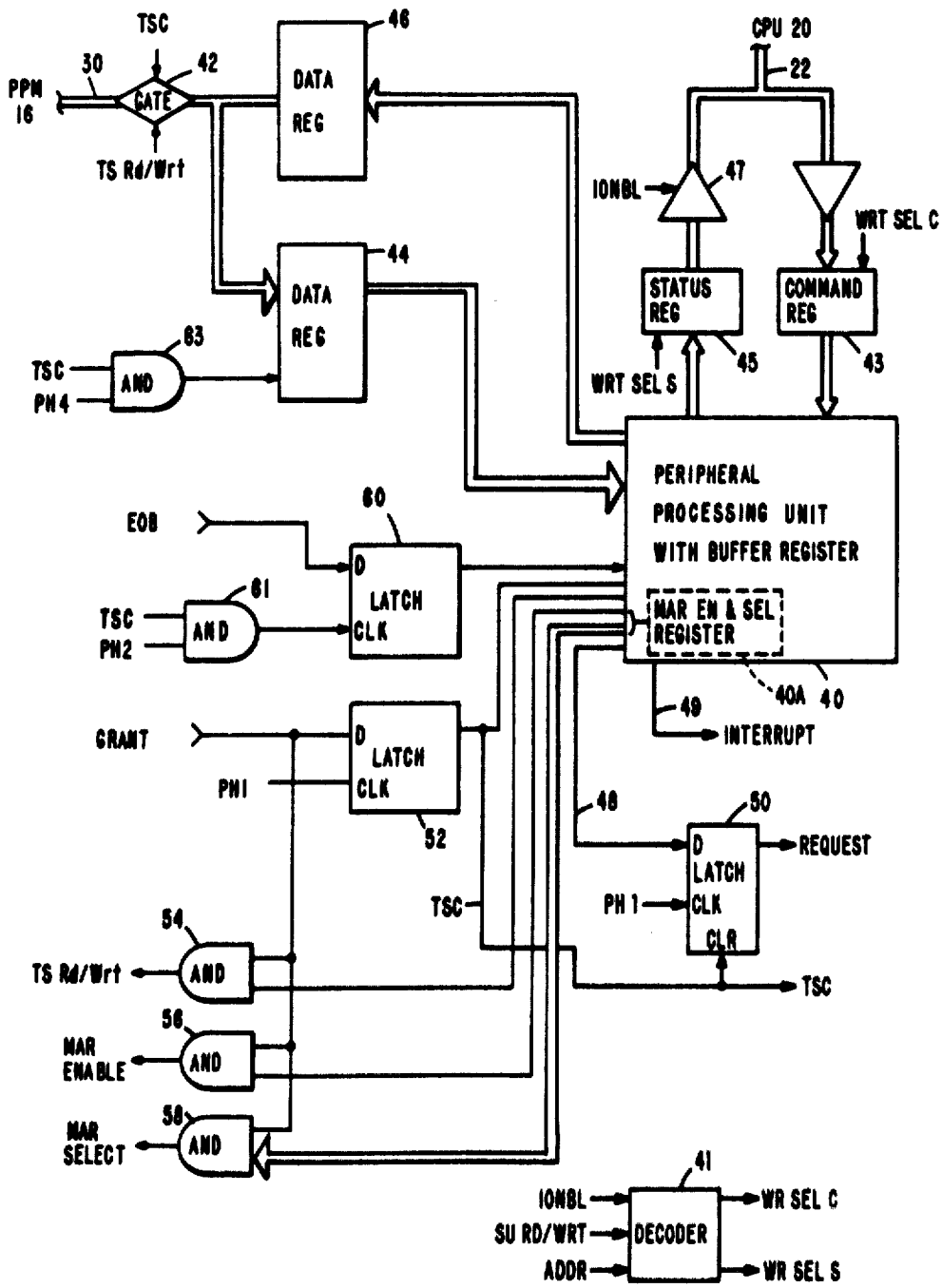
FIG. 2 shows the adapters in FIG. 1 with their peripheral device (peripheral processing unit).

Referring now to FIG. 2, a general schematic showing the preferred configuration of a peripheral adapter is shown. The peripheral device or processing unit 40 and its included buffer registers are not shown in detail. The processing unit would assume different configurations depending upon the peripheral function to be performed. For example, if FIG. 2 represented the scanner/printer peripheral adapter 12 of FIG. 1, then the peripheral processing unit would have to contain a scanning mechanism, logic to process the scan data, and buffer storage to buffer the data until it was ready for transmission to the peripheral processing memory 16 of FIG. 1. Also, the unit 40 if representative of the scanner/printer device 12c would have to include a paper handling mechanism and a printing mechanism plus the buffer storage for print data and print data processing electronics to drive the print head.

If the peripheral processing unit 40 represented the compressor/decompressor 13 or the encryptor/decryptor 14, it would simply consist of logic with buffer storage sufficient to store the quantity of video data being compressed/decompressed or encrypted/decrypted. Similarly, if peripheral processing unit 40 represented the transmitter/receiver 15 of FIG. 1, it would have to include a modulation/demodulation device to transmit or receive data as well as logic and buffer storage to organize the data for transmission/reception.

Thus, FIG. 2 generally represents any type of adapter in FIG. 1 and describes how such a peripheral adapter is attached to the system of FIG. 1. Control data from CPU 20 goes directly to the peripheral processing unit 40 over the bus 22. When the CPU wishes to send control information to the processing unit 40, it sends a supervisory read/write signal (Su Rd/Wrt) and the address of the adapter's command register 43 to the adapter. Decoder 41 in the adapter responds to the address and the Su Rd/Wrt signal and generates the write select C signal (WRT SEL C). This signal enables command register 43 to receive and store the control information over bus 22.

When CPU 20 wishes to check the status of the peripheral processing unit (PPU) 40, it addresses status register 45. The CPU sends decoder 41 a IONBL signal, a Su Rd signal and the address of the status register 45 at the adapter. Decoder 41 generates the Wrt Sel S signal to gate status information from the PPU 40 into status register 45. The IONBL signal then gates driver 47 to pass the information in status register 45 back to CPU 20.

If the PPU wishes to contact the CPU 20, it sends an INTERRUPT signal over signal line 49. The CPU will check the contents of status register 45, as described above, looking for an interrupt status bit. If the bit is present, it comfirms that the device was the source of the INTERRUPT signal.

The above described flow of information to PPU 40 has been control information. Data to be processed comes from the peripheral processing memory PPM 16 over bus 30 through bi-directional driver gate 42. Data read from the memory is stored in register 44 before it is loaded into the peripheral processing unit 40. Data to be written into the peripheral memory 16 is stored in data register 46 while it waits to be gated to the memory 16. Gate 42 is controlled by the TS Read/Write command for steering and by the time share cycle (TSC) signal which enables the gate 42.

After peripheral processing unit 40 has been initialized by commands from CPU 20 over bus 22, the first operation is to request access to memory 16. Processing unit 40 when it wishes access, generates a request a signal on line 48 to latch 50. At the next PH1 clock signal, latch 50 is set. Its output is the request signal sent over one of the signal lines 32 (FIG. 1) to the peripheral processing controller 10.

Figure 3A:
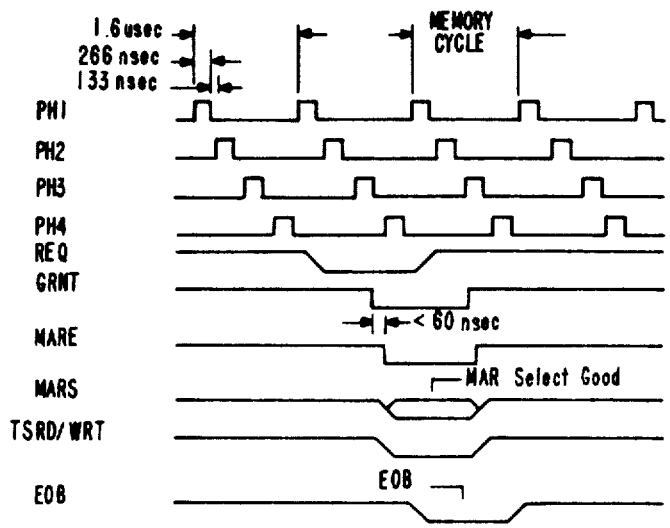
FIGS. 3A and 3B show the timing of signals used in the system.
Figure 3B:
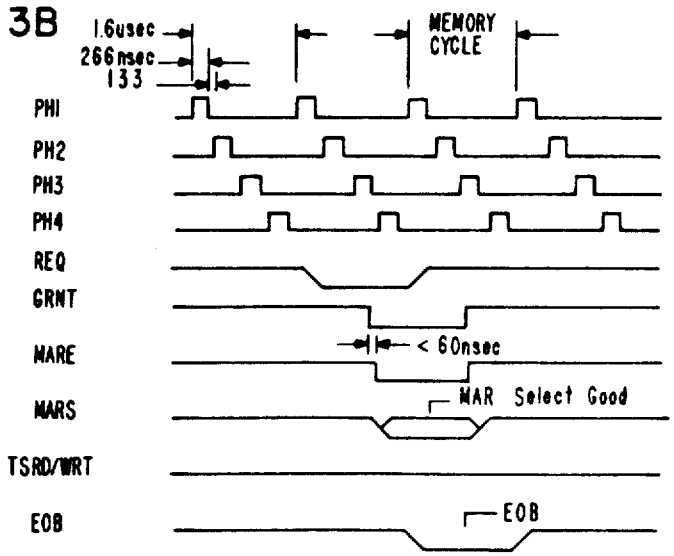

The signals used in FIG. 2 are diagrammed in FIGS. 3A and 3B. FIG. 3A shows a typical write operation, while FIG. 3B shows a read operation. The clock signals have four phases, PH1 through PH4. A single memory cycle is measured from the rising edge of a PH 1 clock pulse to the rising edge of the next PH 1 clock pulse. The presence of a request signal out of latch 50 is shown in FIG. 3A as a pulse REQ that shifts from a higher level to a lower level starting at one PH1 clock pulse time and terminating at the next PH1 clock pulse time.

Figure 6:
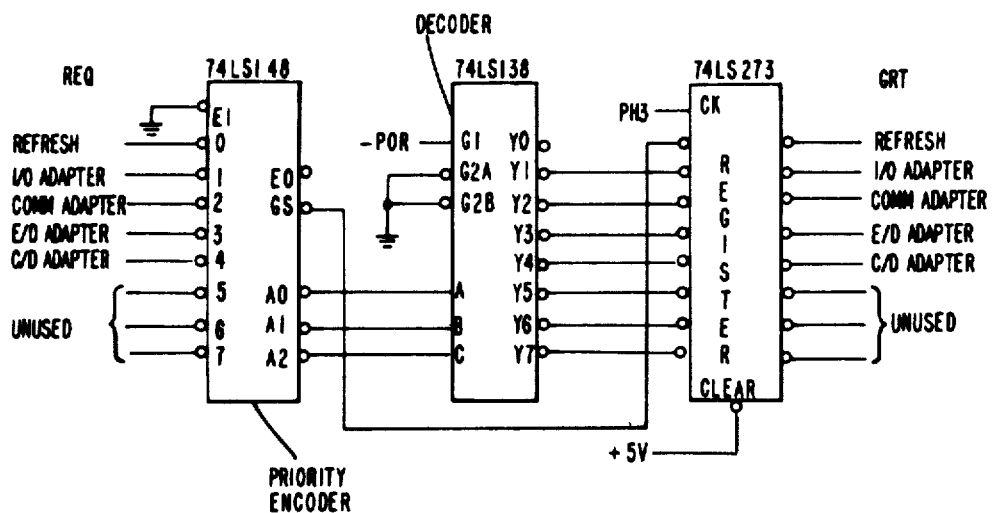
FIG. 6 shows the priority circuits in the peripheral processing controller which respond to requests from the peripheral devices and generate grants of access to the peripheral processing memory.

As shown in FIG. 6, the grant signal, received back from the peripheral processing controller 10 (FIG. 1), is generated at PH3 time. The grant signal stays on until the next PH3 clock pulse. The circuit modules in FIG. 6 are available from Texas Instruments as part numbers 74LS148, 74LS138 and 74LS273. Module 74LS148 is a priority encoder and will have a 3 bit output on lines A0, A1 and A2 representative of the highest priority of the 0-7 inputs. The highest priority is assigned to input 0 and descends to the lowest priority being assigned to input 7. The three bit output is the binary representation of the input line with the highest assigned priority that has a request signal present. For example, if inputs 1, 2 and 4 have a request signal present, the output on A0, A1 and A2 is 001. If requests had been present on inputs 3 and 4, the output would be 011 for input 3.

Decoder 74LS138 simply converts the 3 bit word from encoder 74LS148 back into a single line output. In other words only one of the lines Y0-Y7 has a signal output depending upon the 3 bit word input from A0, A1 and A2. The G1, G2A and G2B inputs are enabling inputs. So long as there is no power-on-reset signal on G1, and inputs G2A and G2B are grounded, decoder 74LS138 is enabled.

The one line of Y0-Y7 that has an output will set its associated stage in register module 74LS273 at PH3 clock time. The clear input to the module is held at +5 volts to enable the register. If the +5 volts is not present, the register is cleared. The stage, that is set at PH3 clock time, has a grant output that is sent back to its associated adapter or to the memory refresh apparatus (not shown). At the next clock cycle the PH3 pulse will reset that stage in the register unless the priority encoder and decoder modules still indicate that same request represents the highest priority request.

In FIG. 2, the grant signal is received by the latch 52. Latch 52 will set at PH1 time when the grant pulse is present. The output of latch 52 is the time shared cycle (TSC) signal. The TSC signal enables gate 42 to connect the data bus 30 to the data registers 44 and 46 and clears the request latch 50. The TSC signal also notifies the processing unit 40 that the request for access has been granted.

When peripheral processing unit 40 activates its request signal, it generates the Read/Write signal which is applied to AND gate 54. The peripheral processing unit 40 also generates a MAR Enable signal and a MAR Select signal. These signals are applied to AND gates 56 and 58, respectively. AND gates 54, 56 and 58 are all enabled by the grant signal received back from the peripheral processing controller 10 (FIG. 1).

The MAR Enable and MAR Select signals are passed to the processing controller 10 in FIG. 1. The Read/Write signal from AND gate 54 is used to steer data through the gate 42 (FIG. 2), drivers 30A and 30B (FIG. 1), and to control the Read/Write function of peripheral processing memory 16.

If the operation is a Write operation, then the TS Read/Write signal will be a negative-going pulse remaining active as long as the grant signal is active (see FIG. 3A). During this Write pulse, data flows from the data register 46 through gate 42 and through driver 30B (FIG. 1) to PPM 16.

The process of request, grant, MAR select and memory addressing continues until the peripheral processing controller 10 in FIG. 1 indicates the end of a block of data has been reached. At that time, the controller 10 generates the (end-of-block) signal which is received in FIG. 2 by latch 60. When the EOB signal is present, the latch is set by the PH 2 signal passed by AND 61. AND 61 is enabled during the time share cycle by the TSC signal. The set condition of latch 60 signals peripheral processing unit 40 that end-of-block has been reached. The latch is reset at the next PH 2 clock signal.

Figure 4:
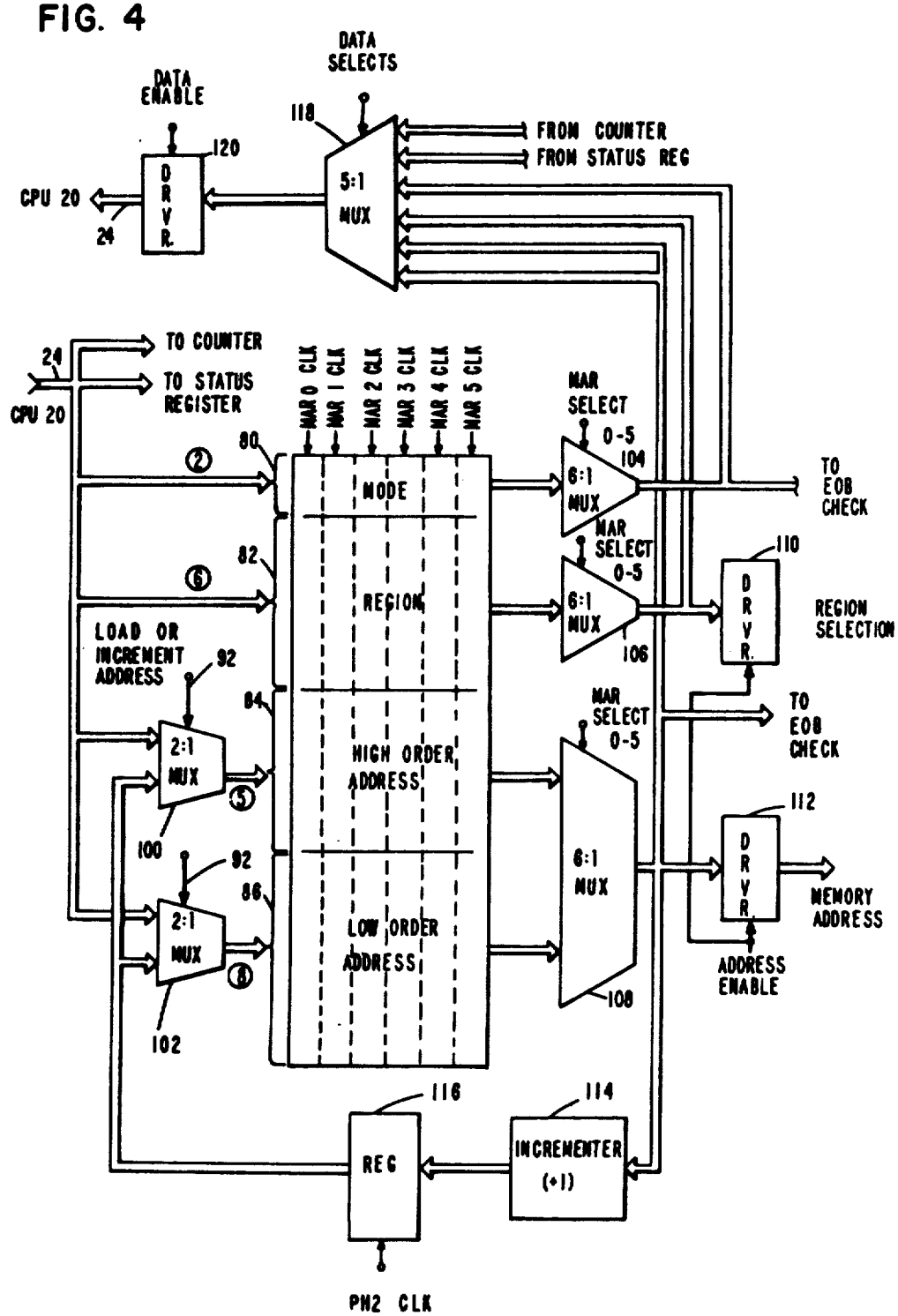
FIG. 4 shows the portion of the peripheral processing controller containing the memory address registers (MARs).
Figure 5:
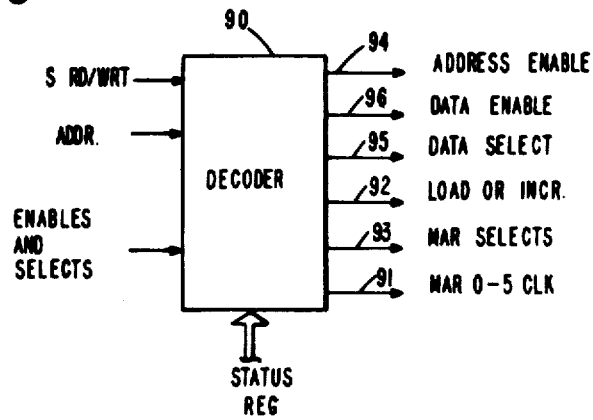
FIG. 5 shows the command decoder in the peripheral processing controller which decodes commands from the supervisory CPU.
Figure 7:
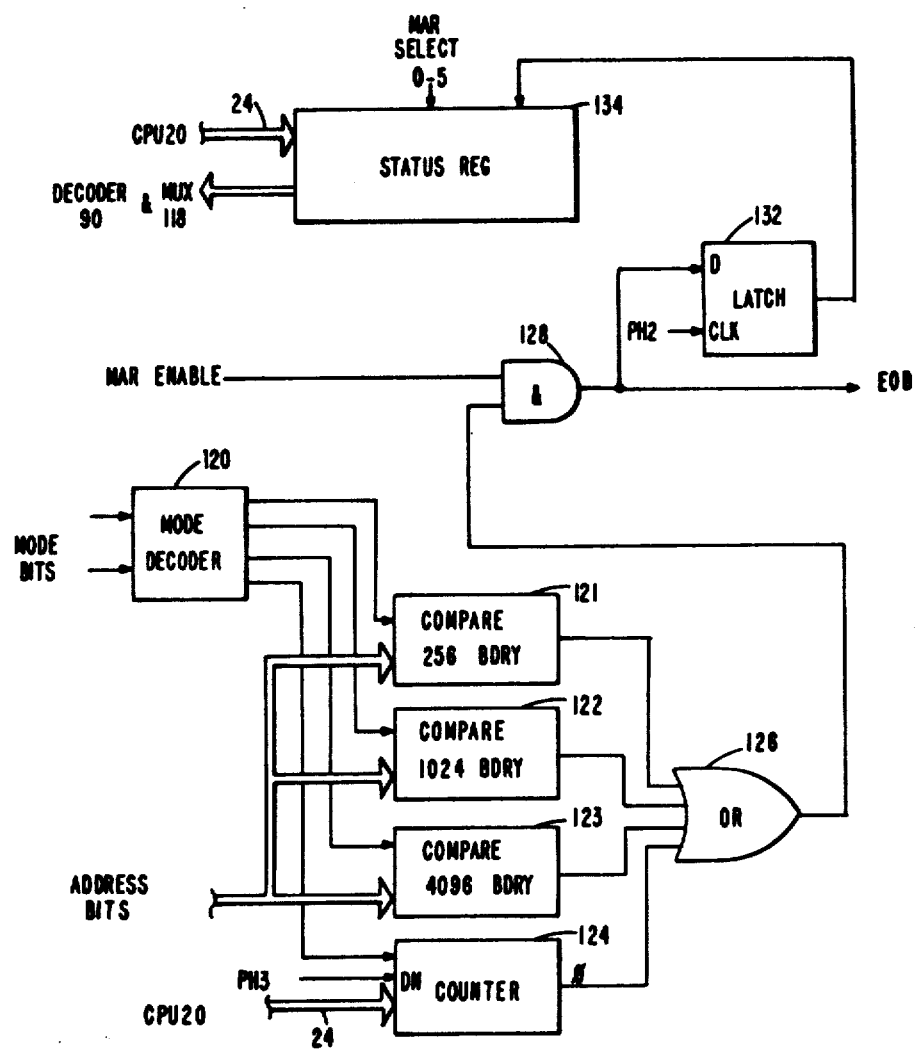
FIG. 7 shows the end-of-block detection apparatus in the peripheral processing controller.

The peripheral processing controller 10 of FIG. 1 is shown in detail in FIGS. 4, 5, 6, and 7. FIG. 4 shows the memory address registers (MARs) and the multiplex switches for gating address and mode information in and out of the (MARs). FIG. 5 shows the decoder that decodes the commands from the CPU or the addresses from the enable and select lines from the peripheral adapters. The decoder generates the commands used throughout the peripheral processing controller. FIG. 6 shows the priority modules which receive requests and issue grants. FIG. 7 shows the end-of-block apparatus that generates the EOB signal which is sent back to the peripheral adapter.

As shown in FIG. 4, the memory address registers (MARs) are divided into four sections, mode 80, region 82, high-order address bits 84, and low-order address bits 86. There are six MARs, MAR0 through MAR5. The mode, region, high-order address, and low-order address sections contain 2, 6, 5 and 8 bits, respectively. In effect, there are six memory address registers each containing 21 bits, two mode bits, six region bits, and thirteen address bits. These MARs are initialized by CPU 20 loading in bytes of control and address information over control bus 24.

The first byte of eight bits is loaded into the mode and region sections of the MAR addressed by CPU 20. Which MAR is addressed is decoded by decoder 90 in FIG. 5. The decoder 90 will respond to an address signal over bus 24 from CPU 20 and generate a MAR 0-5 Clock signal 91 which will select one of the MARs 0-5. Accordingly, the first byte of eight bits is loaded into the register sections 80 and 82 because the CPU sends an address command to decoder 90 in FIG. 5 that causes the decoder to generate one of the MAR 0-5 Clock signals. Five of the eight bits in the second byte are similarly loaded into the MAR section 84. These bits are the high-order address bits specifying an address in peripheral processing memory 16. Finally, the third byte is loaded into the MAR section 86. The third byte contains the low-order eight bits specifying an address in PPM 16. In this way, CPU 20 initializes the six MARs by addressing each MAR, which address is decoded into a MAR clock signal, and loading three bytes of address and control data over bus 24.

For the second and third bytes which contain the high-order and low-order address bits, the CPU 20 must also send a load command. Decoder 90 will then generate the load command over line 92 so that the multiplexers 100 and 102 will pass the bits of the address bytes to the MAR sections 84 and 86. As discussed hereinafter, multiplexers 100 and 102 may be switched to the increment address mode by the CPU 20 after the MAR groups 84 and 86 have been initialized. The increment mode is used to increment the address bits each time a peripheral device is given access. Thus, after initialization, the peripheral devices will work their way through a block of data as addressed by the incremented addresses in the MAR sections 84 and 86.

After all of the MARs have been initialized, and the MAR Enable and Select register 40A (FIG. 2) in each peripheral device has been initialized, CPU 20 signals each peripheral processing unit (PPU) 40 to begin its job. Each PPU requests access. If its request is granted, peripheral processing unit 40 then sends out the MAR Enable signal and the MAR Select signal to the controller 10 (FIG. 1). Decoder 90 in FIG. 5 is inside the controller 10 and decodes the enable and select signal to generate the MAR Select 0-5 signal 93. Each peripheral device in this manner selects its assigned MAR.

The MAR Select 0-5 signal gates the multiplexing switches 104, 106 and 108. Multiplexing switch 106 passes the region address to the peripheral processing memory 16 (FIG. 1). Multiplexer 108 passes the high and low order address bits to the peripheral processing memory. The region selection and address bits go to the memory when the drivers 110 and 112 are enabled by the decoder 90 in FIG. 5. Decoder 90 generates the address enable signal 94 in response to the enable and select signals from the peripheral device.

At the same time that the address bits are supplied to the peripheral processing memory, they are also fed back to the incrementer 114. Incrementer 114 adds one to the address. At Ph 2 clock time the incremented address is then stored in register 116.

When the increment address signal 92 comes from the decoder 90, the incremented address in register 116 is stored back into sections 84 and 86 of the selected MAR. In this way, the address in a MAR is advanced by one to the next address position each time the peripheral device accesses the memory.

Also shown in FIG. 4, is the multiplexing switch 118 and the driver 120. Multiplexing switch 118 and driver 120 are controlled by the decoder in FIG. 5 in response to commands from the CPU 20. When CPU 20 wishes to check the status of the MARs, it sends a command to the controller which is decoded by decoder 90 (FIG. 5). Decoder 90 generates a Data Select signal 95 to switch multiplexer 118 and a Data Enable signal 96 to activate driver 120. The selected data is gated through the multiplexing switch 118 and is driven by driver 120 on to bus 24 back to the CPU.

The only remaining function in the controller 10 (FIG. 1) is the end-of-block (EOB) detection. This apparatus is shown in FIG. 7. The end-of-block checking apparatus has four different modes of operation. The mode bits stored in the MAR register group 80 in FIG. 4 control the mode of operation of the end-of-block checking apparatus.

When a selected MAR is read out through the multiplexers 104, 106 and 108 in FIG. 4, the two mode bits from that MAR are passed to the mode decoder 120 in FIG. 7. Decoder 120 decodes the two bits into one of four possible mode conditions and enables one of the comparators 121 through 123 or counter 124.

The comparators 121 through 123 also receive the low order address bits from the selected MAR. From these address bits, these comparators look for a boundary condition indicating the end of a block of data in memory.

Comparator 121 looks for an address position 255. Comparators 122 and 123 look for address positions 1,023 and 4,095 respectively. These comparators are monitoring the lowest order address bits for an all ones condition. Comparator 121 looks for the eight lowest order bits to be all ones; comparator 122 looks for the ten lowest order bits to be all ones; and comparator 123 looks for the twelve lowest order bits to be all ones. When a MAR is selected and its mode bits enable one of the comparators 121 through 123, that comparator will check to see if the MAR is addressing the boundary condition that the comparator is looking for. If it is, an end-of-block (EOB) signal from the selected comparator is passed by OR 126 to AND gate 128.

The fourth mode that the end-of-block apparatus may use is to count the number of accesses to the memory. If the MAR has mode bits indicating this mode, then counter 124 is enabled by the decoder 120 each time that MAR is selected during a memory access cycle. Counter 124 is loaded by CPU 20 over bus 24 with a count specifying the number of accesses necessary to process a data block. At the same time, the MAR would be set up by the CPU 20 with the initial address starting the block. Each time the MAR using this fourth mode is selected, the mode decoder 120 in FIG. 7 will enable the counter 124 to receive a PH 3 clock pulse to count the counter down. When the counter 124 is counted down to zero, the end of the block condition has been reached. The zero condition from counter 124 is collected by OR 126 and also passed to AND 128.

The end-of-block condition out of OR 126 is passed by AND 128 after MAR Enable is active. There will be a MAR Enable during each time share access. If there is an end-of-block condition detected, during the period when the MAR Enable signal is active, then the EOB signal is sent to the peripheral adapters. Then the peripheral device having access detects the EOB signal.

The end-of-block signal is also used to set latch 132. Latch 132 is set at PH 2 clock pulse time when the EOB signal is present. Latch 132, in turn, loads an EOB bit condition into the status register 134. Each stage of the register 134 is associated with one of the six MARs in FIG. 4. Accordingly, if an end-of-block condition is detected for that MAR, an EOB bit is loaded into that stage of the status register 134 associated with the MAR.

When a stage of the status register 134 is set, it indicates to the decoder 90 in FIG. 5 that a particular MAR has reached an end-of-block condition. The decoder inhibits the selection of that MAR thereafter until the MAR is again initialized and the status register stage for that MAR is reset by CPU 20.

Figure 8A:
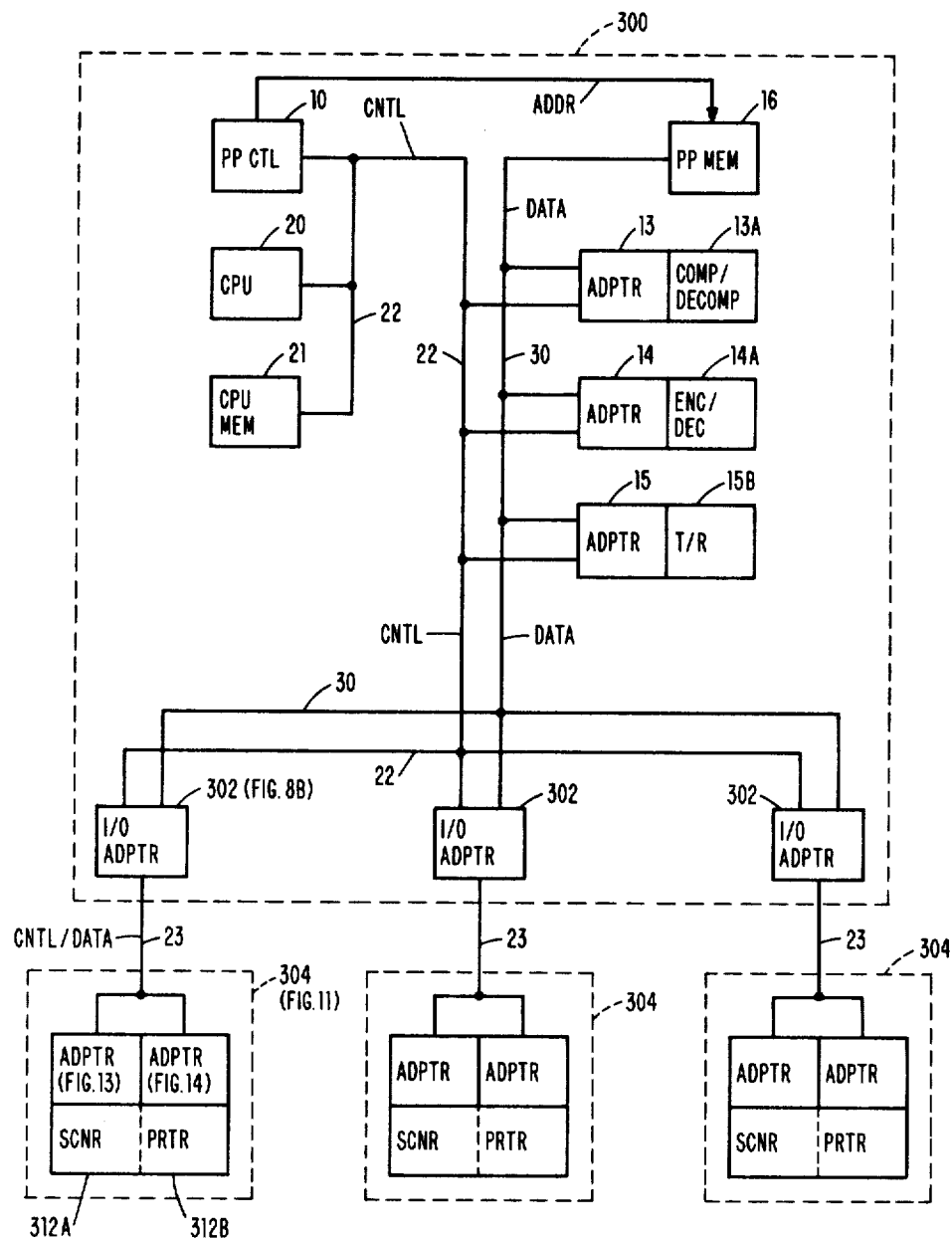
FIG. 8A shows a modular document distribution terminal in accordance with the present invention.

Referring now to FIG. 8A, a document distribution terminal, similar to that of FIG. 1, has been redrawn in a modular configuration. In addition, slightly different I/O adapters are used and there are additional adapters at each scanner/printer module. Functional blocks in FIG. 8A that are identical to those in FIG. 1 have been given the same reference numerals. To simplify FIG. 8A, hard-wired control lines have been omitted and each of the buses for data and control information have been drawn as single lines. The buses have retained the same reference numerals as used in FIG. 1.

In FIG. 8A, the system processor, CPU 20, and the communication peripheral devices have been modularized into a communications module 300. The scanner/printer apparatus and its scanner/printer processor 180, all shown in FIG. 11, have been shown in FIG. 8A as modules 304. Three scanner/printer modules 304 are illustrated.

Figure 8B:
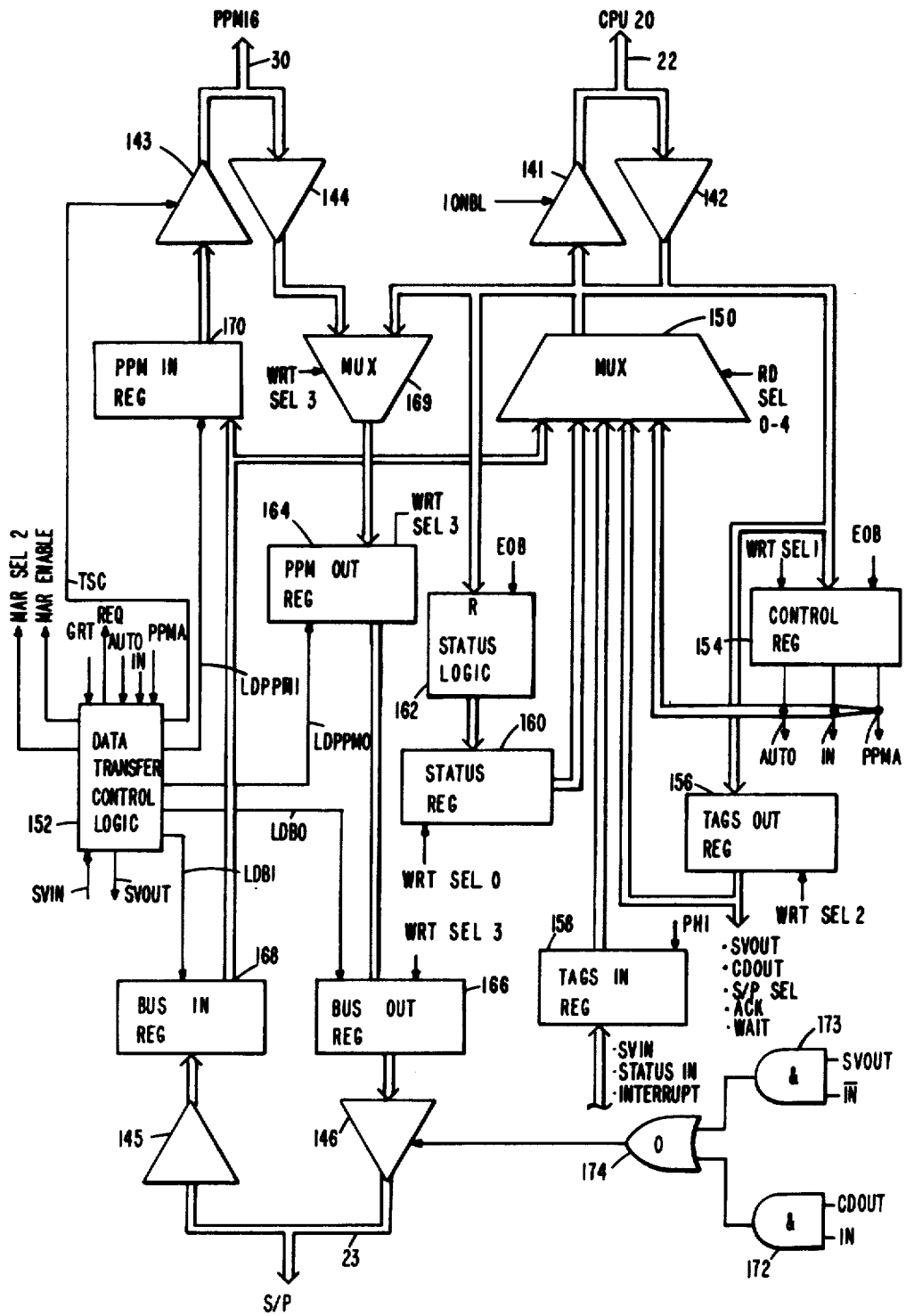
FIG. 8B shows the I/O adapter of FIG. 8A.
Figure 13:
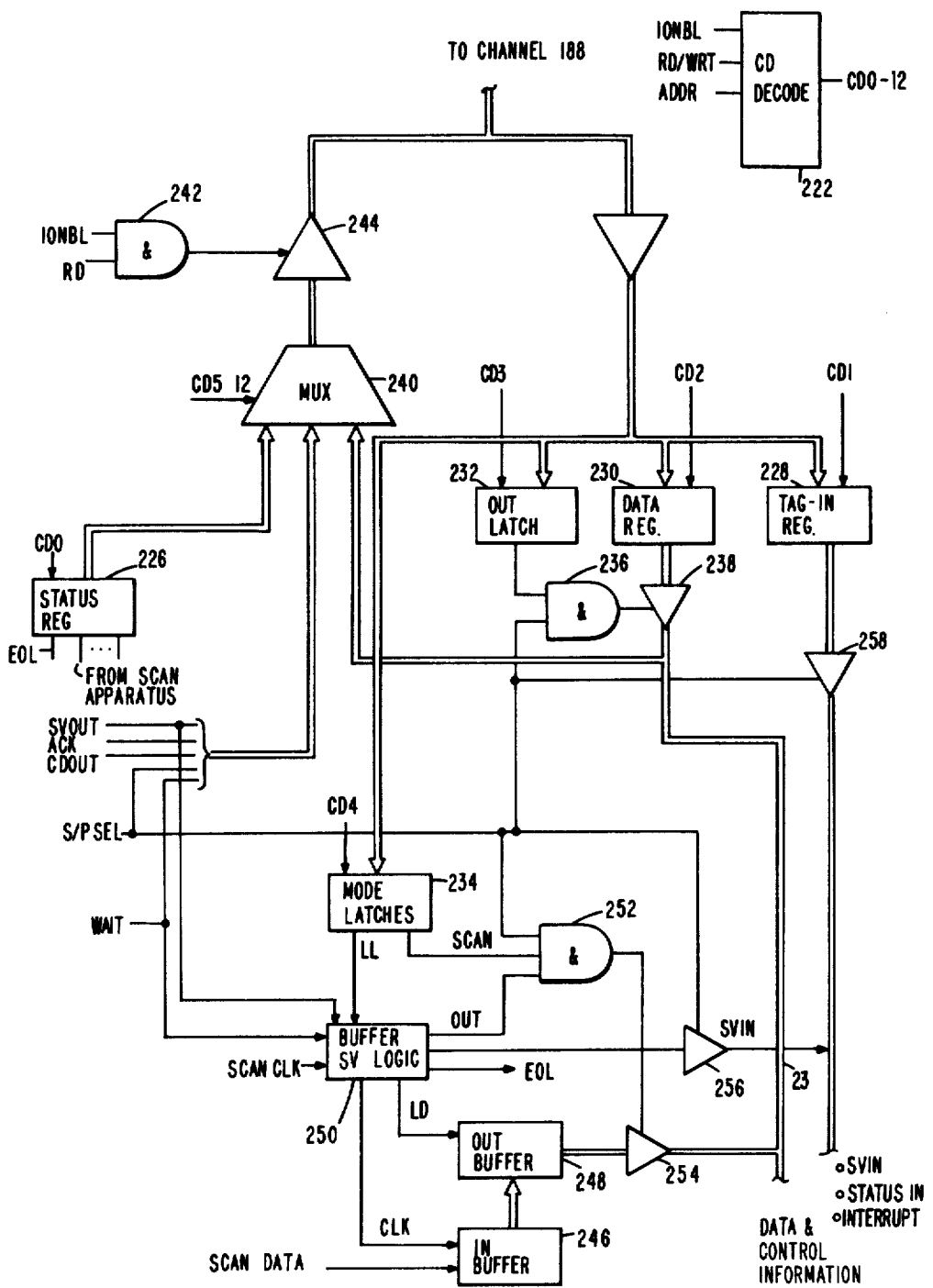
FIG. 13 shows the scan control adapter 202 of FIG. 11.
Figure 14:
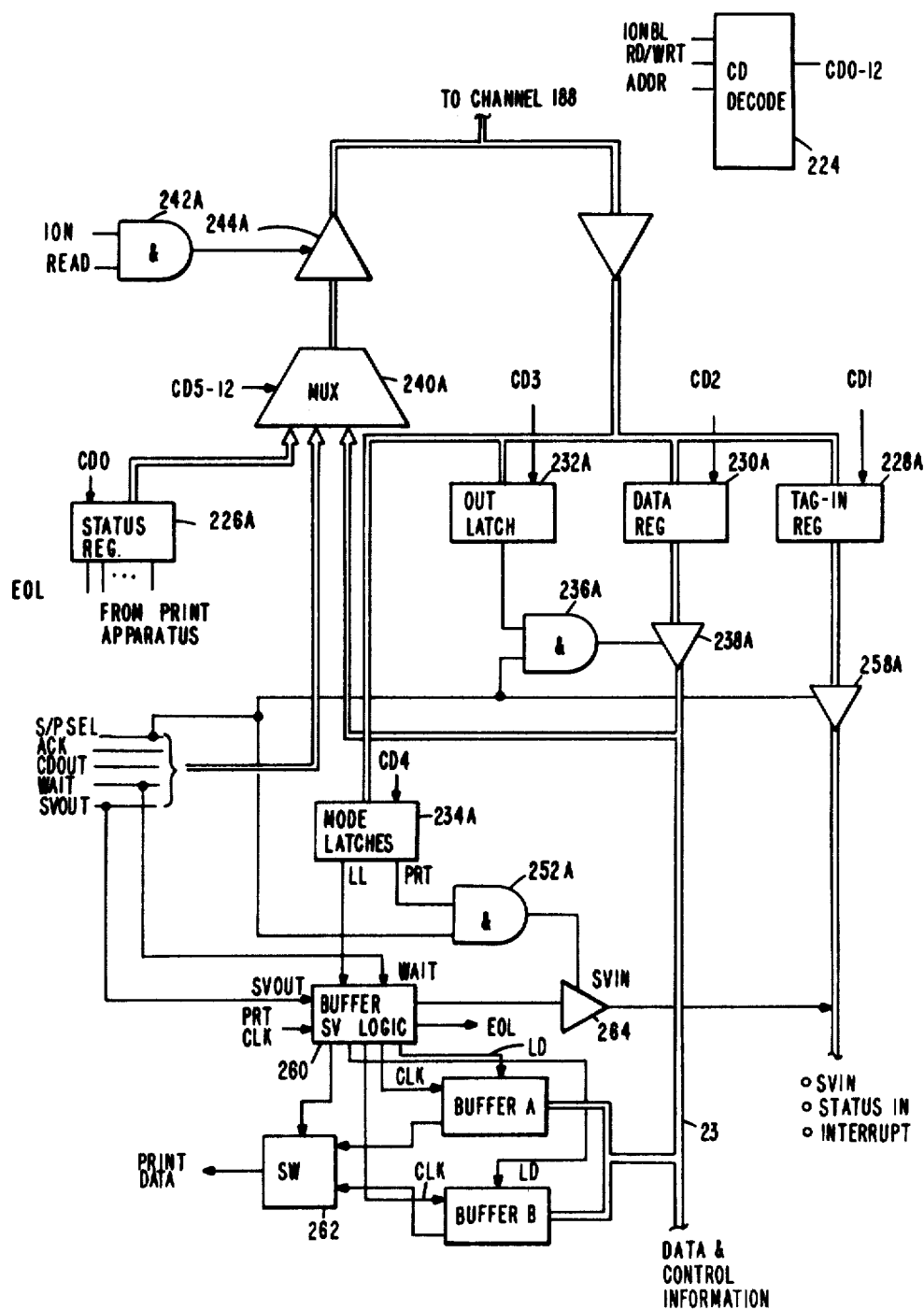
FIG. 14 shows the print control adapter 198 of FIG. 11.

Within the communication module 300, there is a separate control information bus 22 and a data bus 30. Between the communication module 300 and each of the scanner/printer modules 304 there is a single control-information/data bus 23. The details of I/O adapter 302 are shown in FIG. 8B. Details of the scanner adapter are shown in FIG. 13 and details of the printer adapter are shown in FIG. 14.

In FIG. 8B, the I/O Adapter 302 of FIG. 8A is shown. The control channel 22 connects to the adapter via drivers 141 and 142. The data channel 30 connects the adapter to the peripheral processing memory 16 (FIG. 8A) via the drivers 143 and 144. The scanner and printer modules are connected to the adapter via data and control information bus 23 through drivers 145 and 146. The other input/output lines labeled in FIG. 8B are control lines connected between the adapter and the CPU 20 or between the adapter and the scanner/printer modules. Exceptions are the read and write select signals which are generated by the decoder 148 in FIG. 9.

The inputs to decoder 148 are signal lines from the CPU 20. Decoder 148 in FIG. 9 generates the Read Select 0–4 signals used to control the multiplexing switch 150 in FIG. 8B when reading information from the adapter or scanner/printer modules to CPU 20. Write Select 0–3 lines are generated by decoder 148 (FIG. 9) when CPU 20 wishes to write control information into four selectable registers in the adapter.

The I/O Adapter of FIG. 8B may be viewed as a device having two modes of operation, automatic and supervised. The supervised mode is under control of CPU 20. In this mode, CPU 20 loads address and control information into the I/O Adapter and the scanner/printer modules. The automatic mode of operation is used for direct transfer of data between the scanner/printer modules and the peripheral processing memory 16. It is under the control of data transfer logic 152.

Examining the supervised mode of operation first, the CPU 20 sets up the control register 154, the TAGS OUT register 156, the TAGS IN register 158 and the status register 160. Control register 154 contains bits indicating the mode of operation of the adapter, the direction of data flow in or out relative to the PPM 16 or the CPU 20, and whether space in the PPM is available (PPMA). These signal bits are gated into control register 154 by the WRT SEL 1 signal from decoder 148.

The TAGS OUT register 156 contains digital bits which represent control data. The TAGS OUT register may contain a service out (SVOUT) bit, a command out (CDOUT) bit, an acknowledge (ACK) bit, a WAIT bit or a scanner/printer select (S/P SEL) bit. These bits are loaded in from CPU 20 when a WRT SEL 2 signal from decoder 148 gates register 156. The TAGS IN register 158 may contain the service in (SVIN) bit, an INTERRUPT bit or a STATUS IN bit. These signals come from the scanner/printer module and, if present, are loaded in register 158 by a PH1 clock pulse every clock cycle.

Figure 9:
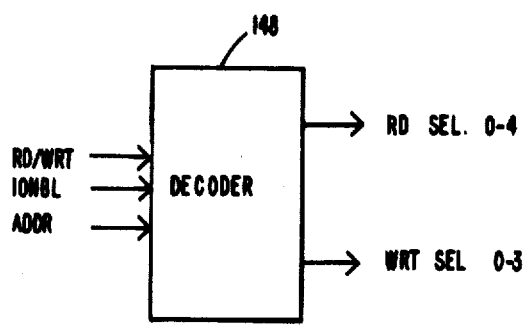
FIG. 9 shows a command or address decoder used in the I/O adapter of FIG. 8B.

The status register 160 is set by the WRT SEL 0 signal from decoder 148 (FIG. 9). The status register will contain bits indicating the EOB (end-of-block) signal has been received or may contain bits indicating various error conditions. The detection of error conditions is not a part of the invention and is accordingly not discussed further herein. Resetting of the status register is controlled by the status logic 162 which responds to the EOB signal from the peripheral processing controller 10 (FIG. 8A) and to initialization conditions from CPU 20.

CPU 20 may also write control information to a scanner/printer module via the PPM (peripheral procesing memory) OUT register 164 along with the multiplexing switch 168, are all selected by a WRT SEL 3 signal from decoder 148 (FIG. 9). Thus, when a WRT SEL 3 signal is present there is a straight connection from CPU 20 through to BUS OUT register 166 via the multiplexing switch 168 and PPM Out register 164. The control information is gated to a scanner/printer module by driver 146 when a command out (CDOUT) signal and an IN signal are present at AND 172. The scanner/printer module to receive the control information is addressed by the scanner/printer select address (S/P SEL) from the TAGS OUT register 156.

Control information at a scanner/printer module may be read back to CPU 20 via the BUS IN register 168 and the multiplexing switch 150. The information is gated back to CPU 20 by first loading it into the BUS IN register 168. The CPU then signals decoder 148 to bring up the RD SEL signal to pass the information from BUS IN register through multiplexing switch 150.

The PPM IN register 170 is not used during the supervised mode. Register 170 is used to buffer video data information between the BUS IN register and the peripheral processing memory 16. Its function will be described hereinafter when the AUTO mode operation is explained.

The operation of I/O adapter of FIG. 8B will be explained by going through typical supervised and automatic operations. The supervised operations refer to conversations between CPU 20 and a scanner/printer module. Automatic operations refer to data flow between the scanner/printer module and the peripheral processing memory 16.

As a first example, CPU 20 will set up control information in one of the scanner/printer modules. The CPU first sends a signal, which is decoded by decoder 148 as WRT SEL 1, and loads in control information into the control register 154. The control information in this example would be not-AUTO mode, not-IN mode and PPMA (Peripheral Processing Memory Available). Next, CPU 20 generates a WRT SEL 2 signal and loads the TAGS OUT register 156 with the S/P SEL bit for the scanner/printer module to which control data is to be sent. Then CPU 20 generates the WRT SEL 3 signal and puts the control data into the BUS OUT register 166 via the multiplexing switch 168 and the PPM OUT register 164.

Next, CPU 20 loads a CDOUT bit to the TAGS OUT register 156 with the WRT SEL 2 signal. The CDOUT bit is at a different position in the register from the S/P SEL bit. To preserve the S/P SEL bit, the bit may be rewritten into the TAGS OUT register at the same time as the CDOUT bit. Alternatively, only the CDOUT bit may be written.

With the CDOUT bit present in the TAGS OUT register, the CDOUT line at AND gate 172 is on and the IN line for AND gate 172 is on. Therefore, AND 172 has an output which is passed by OR 174 and enables driver 146. The control data in register 166 is then passed by the driver 146 to the scanner/printer module selected by the S/P SEL bit.

When the scanner/printer module receives the control data, it responds with a STATUS IN signal to register 158 and a status information byte back over bus 23 to the BUS IN register 168. Driver 145 simply passes the information from bus 23 into the BUS IN register 168. A read select signal from the CPU switches MUX 150 to pass the BUS IN register contents to CPU 20 through the driver 141. Driver 141 is enabled by an I/O enable (IONBL) command from CPU 20 when it wishes to read the information. The scanner/printer module notifies CPU 20 about the presence of status information by raising a STATUS IN bit in the TAGS IN register 158. When the CPU 20 reads the STATUS IN bit through MUX 150 from the TAGS IN register 158, it will next switch the MUX to read in the BUS IN register contents. When the CPU 20 has received the status information it acknowledges the status information by dropping the CDOUT bit in the next clock cycle. CPU 20 resets the CDOUT bit in the TAGS OUT register 156. This drops the CDOUT signal and signals the scanner/printer module that the status information was received by the CPU.

The above-described process is the manner in which the CPU 20 communicates with the scanner/printer modules to set up the modules for a processing operation. This sequence is initiated by the CPU 20. The scanner/printer modules can initiate communication with CPU 20 by raising an INTERRUPT bit.

The interrupt operation occurs when the scanner/printer module detects it has completed the job assigned to it by the CPU 20. For example, it may have detected the end of a scan line or a print line. The interrupt operation starts with the printer or scanner module raising the INTERRUPT tag. The INTERRUPT bit is set in the TAGS IN register 158 at PH1 clock time. When CPU 20 reads the registers and detects the INTERRUPT tag, it will respond with an ACKNOWLEDGE tag in the TAGS OUT register 156.

When the scanner/printer module sees the ACKNOWLEDGE tag in the TAGS OUT register 156, it drops the INTERRUPT tag. Thus at the next PH1 clock time, the INTERRUPT bit in the TAGS IN register 158 is reset. The next time the CPU 20 checks the TAGS IN register and sees that the INTERRUPT tag has dropped, it again responds with an ACKNOWLEDGE tag in the TAGS OUT register. This completes the interrupt operation.

The scanner/printer module may also signal termination of a data transfer operation. To do this, the module places status information in the BUS IN register 168 and raises the STATUS IN bit. CPU 20 reads the STATUS IN bit in register 158 and reads out the status information via the multiplexing switch 150. CPU 20 then raises the SVOUT bit in register 156 to signal receipt of the status information. The scanner/printer module then drops STATUS IN, and the CPU thereafter drops SVOUT.

So far, the adapter in FIG. 8B has been described in the supervised mode of operation where the CPU 20 controls the adapter and talks to the scanner or printer module. In the automatic mode of operation, the adapter is controlled by the data transfer control logic 152. In this mode of operation, data flows between the peripheral processing memory 16 and the scanner or printer module.

In the automatic (AUTO) mode the only registers used are the PPM IN register 170, the PPM OUT register 164, the BUS IN register 168 and the BUS OUT register 166. The PPM OUT register and the BUS OUT register act as a two-step buffer when data is flowing from PPM 16 to a printer module. Likewise, the BUS IN register 168 and the PPM IN register 170, act as a two-step buffer when video data is flowing from a scanner module to PPM 16. Using a two-step buffering arrangement is not mandatory, but it does reduce the likelihood that a scan/print operation will be interrupted because of data flow interruption.

Figure 10:
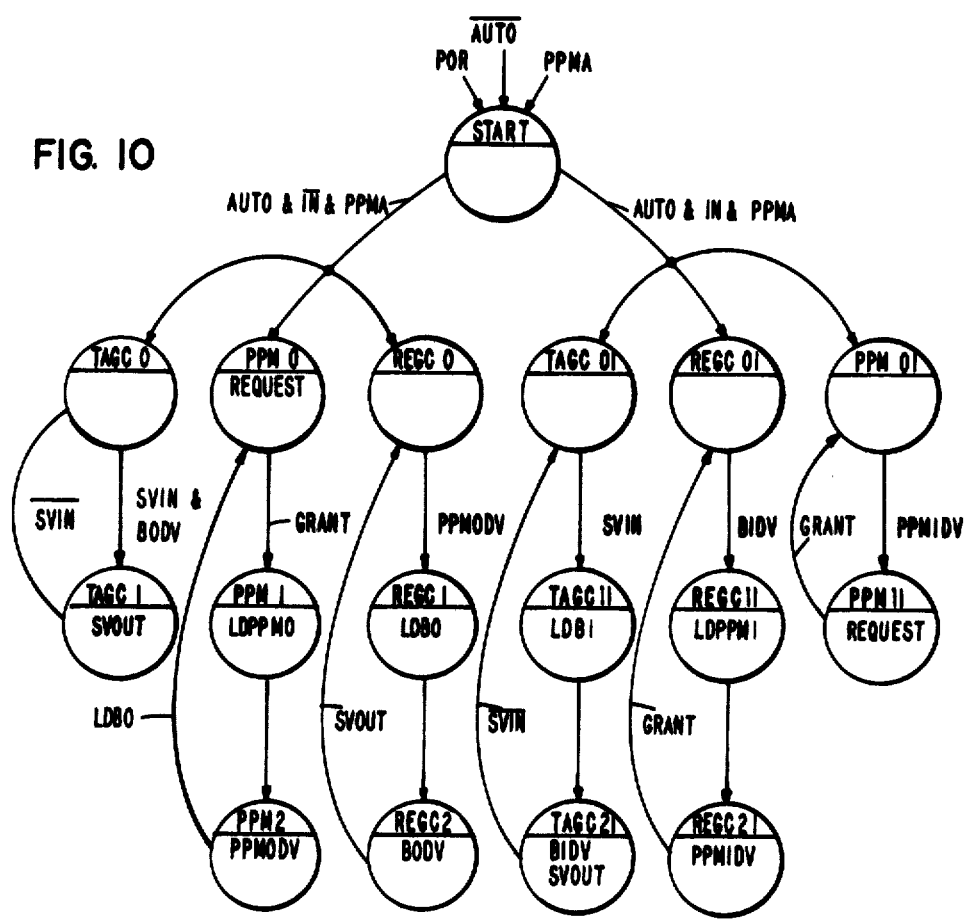
FIG. 10 shows the logic states of the data transfer control logic 152 in the I/O adapter of FIG. 8B.

The gating of data through the IN registers 168 and 170 or through the OUT registers 164 and 166 is controlled by the data transfer control logic 152. The operation of this logic is best understood by referring to FIGS. 8B and 10 simultaneously. FIG. 10 is a state diagram for the data transfer control logic 152. In FIG. 10, the states are represented by circles. The conditions that cause a change in state are indicated on the connection lines between the circles. If there is no condition indicated, the logic will automatically transition from one to the next state during the next clock cycle. Otherwise, the logic will transition from one to the next state upon the occurrence of the condition and the clock cycle.

In the state diagram, the right hand half of the diagram corresponds to the operation when data is flowing into the PPM. The left hand half of the state diagram shows the states when data is flowing out of the PPM and in to the scanner or printer module. In each of these halves, the tag control (TAGC) states, the PPM data gating (PPM) states and the register control (REGC) states are arranged in columns and operate in parallel as their conditions are satisfied.

Referring now to FIGS. 8B and 10, the I/O adapter operates in the AUTO mode in the following manner. The start state is entered when a POR (power on reset) signal, a PPMA signal or not-AUTO mode signal is present. When the auto mode condition is present, the logic will branch right or left in the state diagram, depending on whether the data flow is into the PPM or out of the PPM, respectively. If the data flow is to be in to the PPM, then the states Tag Control 0 In (TAGC0I), Register Control 0 In (REGC0I), and PPM 0 IN (PPM0I) are entered. When the scanner module generates the service in signal (SVIN), logic 152 transitions to state TAGC1I. In this state, the Load bus In (LDBI) signal is generated, and the video data is loaded into BUS IN register 168.

In the next cycle, state TAGC2I is entered. In this state, the Bus In Data Valid (BIDV) signal and the SVOUT signal are generated. The SVOUT signal goes back to the scanner module to acknowledge the loading of the BUS IN register. The BIDV signal is the condition which causes the logic to pass from state REGC0I to REGC1I. In state REGC1I the Load PPM IN signal (LDPPMI) is generated. The LDPPMI signal is used to gate the PPM IN register 170. When this signal is present, the contents of the BUS IN register 168 is transferred to the PPM IN register 170. In the next clock cycle, logic 152 passes from state REGC1I to REGC2I and generates the PPM IN Data Valid (PPMIDV) signal. At the same time, the SVOUT signal, which was previously generated in state TAGC2I, is acknowledged by the scanner module dropping the service in signal (SVIN). When SVIN drops, the transfer control logic 152 moves from state TAGC2I back to state TAGC0I, ready for the next SVIN signal which will cause the loading of the BUS IN register with the next word of scan data.

The PPM0I state transitions to the PPM1I state upon the occurrence of the PPMIDV signal generated in state REGC2I. In state PPM1I, the request signal is generated and passed to the controller 10 in FIG. 1 (see also FIG. 6). When the grant signal comes back from controller 10, the PPM states change from PPM1I to PPM0I. At the same time, the register control states in logic 152 change from REGC2I to REGC0I. The receipt of the grant signal also causes generation of the time share cycle (TSC) signal at PH1 clock time (in the same manner as previously described for latch 52 in FIG. 2). Similarly, the grant signal also triggers the generation of the MAR enable and MAR select signal (in the same manner as as previously described for ANDs 56 and 58 in FIG. 2). Typically the MAR select signal is a predetermined hardwire connection rather than a programmable selection. In other words, the I/O adapter will always generate the MAR Sel 2 signal that selects MAR 2. The AUTO-IN-PPMA states will continue to cycle as just described until the scanner module has completed sending data to PPM 16.

When the flow of video data is out of the PPM 16 and into the printer module, the states used in the state diagram of FIG. 10 are on the left hand side of the diagram. In this condition, the state transitions from the start state to the TAGC0 state, the PPM0 state and the REGC0 state when an AUTO, a not-IN and a PPMA condition exists.

In the PPM0 state, the request signal is generated and sent to the controller 10. When the grant signal is returned by the controller to the data transfer control logic 152, the logic transitions to state PPM1. In the PPM1 state, the load PPM OUT signal (LDPPMO) is generated. This signal gates data received from the PPM 16 into the PPM OUT register 164.

The grant signal that causes the transition to PPM1 also generates the MAR enable and MAR select 2 signal (in the same manner as previously described for FIG. 2). The grant signal gates the PPM OUT register to receive data and also gates the address from the selected MAR to retrieve the data from the PPM 16 that is read into the PPM OUT register 164.

At the next clock cycle, the transfer control logic 152 transitions from PPM1 and PPM2. In state PPM2, the transfer control logic generates the PPM OUT Data Valid (PPMODV) signal. The PPMODV signal is used to transition from state REGC0 to REGC1. In state REGC1, the Load Bus Out (LDBO) signal is generated. The LDBO signal enables BUS OUT register 166 to receive the data from PPM OUT register 164.

The LDBO signal also causes logic 152 to transition from state PPM2 to PPM0. In PPM0 state the next request signal is generated. In the next clock cycle, the register control state transitions from REGC1 to REGC2. In state REGC2, the Bus Out Data Valid condition is generated.

In state TAGC0 logic 152 looks for the BODV condition and the SVIN signal from the printer module. When SVIN and BODV conditions are present, the logic 152 transitions from a state TAGC0 to TAGC1. In TAGC1 state the SVOUT signal is generated. The SVOUT signal, combined with the not-IN mode satisfies AND 173 and enables driver 146 to pass the contents of BUS OUT register 166 to the printer module. SVOUT also causes register control state to transition from REGC2 back to REGC0. Finally, SVOUT signal is also sent to the printer module, and the printer module drops the SVIN signal. With the SVIN signal down or not present, logic 152 transitions from state TAGC1 back to state TAGC0. This sequence of states continues until the printer module receives all the video data it needs from PPM 16.

When an end-of-block condition is detected by the controller 10, the PPM Available (PPMA) bit is reset in the control register 154. The not-PPMA condition causes the logic to revert to the START state. The logic will stay in the START state until PPMA comes back and the AUTO mode comes back.

Figure 11:
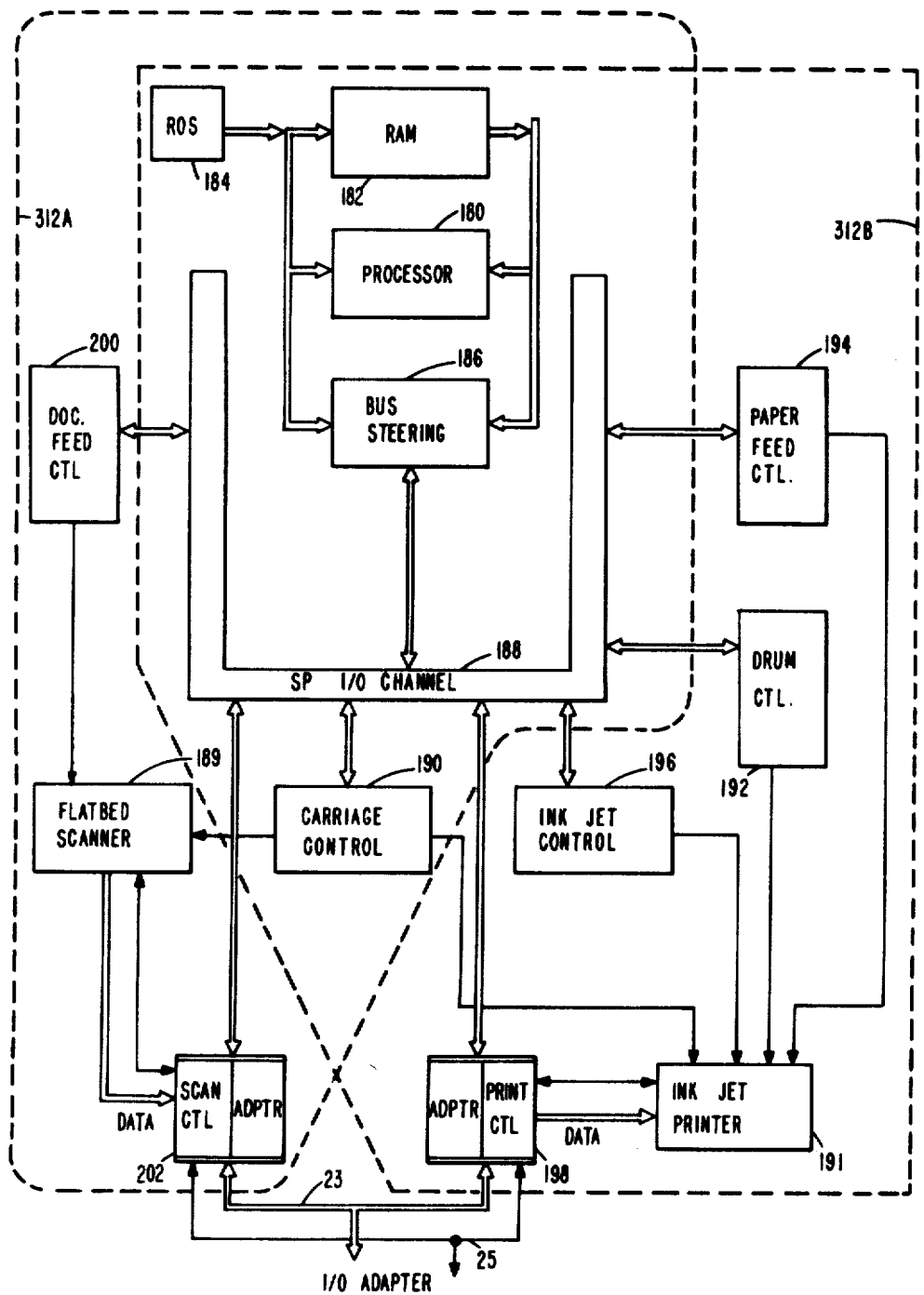
FIG. 11 shows the scanner and printer modules of FIG. 8B.

Referring now to FIG. 11, the scanner/printer module 304 of FIG. 8A is shown schematically. The scanner/printer is organized so that it may be broken into a scanner alone or a printer alone or used as a scanner/printer combination. Dashed lines 312A surround the apparatus that would be used to build a scanner module 312A shown in FIG. 8A. Dashed lines 312B surround the apparatus that would be used to build a printer module 312B as shown in FIG. 8A. All three configurations (scanner, printer, scanner/printer) are supervised by a microprocessor. The microprocessor consists of Processing Chip 180, Random Access Memory Chip 182, Read Only Store Circuit Chip 184, and Bus Steering Circuit Chip 186. The Read Only Store Memory 184 provides the programs for the processor 180. The RAM 182 provides a work area memory for the processor 180. The processor supervises all the control functions for the scanner/printer through the scanner-printer I/O channel 188.

The particular scanner used or printer used is a matter of choice. Indicated schematically in FIG. 11 are flat-bed scanner 189 and an ink jet printer 191. In addition to sharing a microprocessor, these devices also share a carriage control 190. The carriage control is simply logic apparatus to drive a lead screw that moves a carriage carrying the scanner optics or the ink jet nozzle. Since a flatbed scanner is used there are no other moving components in the scanner. However, in the printer, the paper would be mounted on a drum which would rotate as the ink jet nozzle passes axially down the length of the drum. Therefore, the printer also requires a drum control 192.

The ink jet printer 191 in addition to requiring a carriage control 190 and a drum control 192, also needs a paper feed control 194, an ink jet control 196, and print control 198. The paper feed control 194 under supervision of the processor 180 controls the loading and unloading of paper onto the drum. The drum control 192 controls the rotational speed of the drum during the load/unload of paper (low speed) and during the ink jet printing operation (high speed). The ink jet control 196 under supervison of the processor 180 controls the turning on and off of the ink jet nozzle and the control of the crystal drive perturbing the ink jet stream and the pressure pump that pressurizes the ink to generate the ink stream. The print control 198 deserializes the data bytes received from the I/O Adapter (FIG. 8) and provides the serial data to the charge electrode in the ink jet printer 191. By changing the charge applied to the drops, the drops may either be deflected to the gutter in the printer or allowed to pass to the paper on the print drum.

Figure 12:
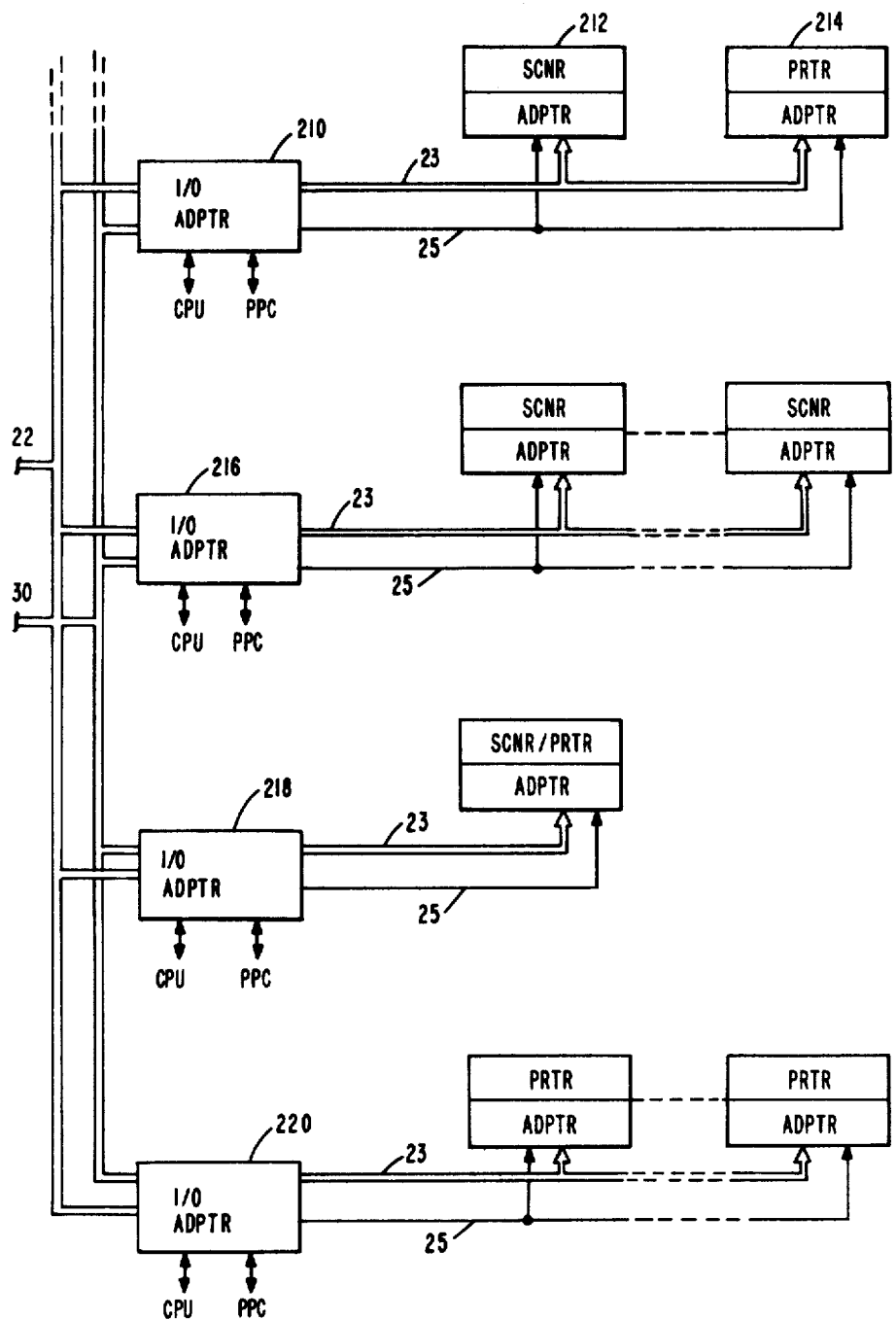
FIG. 12 shows some of the many configurations for connecting data entry, scanner and printer modules to the system through multiple I/O adapters.

With regard to the scanning operation, the flatbed scanner 189 requires in addition to the carriage control 190, the original document feed control 200 and the scan control 202. The document feed control 200 would control the automatic feeding of an original document onto the flatbed document glass of flatbed scanner 189. After a scan operation is complete, the feed control 200 feeds the document off the document glass and loads the next original document onto the document glass. The scan control 202 would control the illumination in the flatbed scanner and calibrate the scanner for illumination variations and document variations. Finally the scan control 202 would convert the serial data stream from the scanner into bytes, which then could be transmitted over channel 23 to the I/O Adapter (FIG. 8B). As previously discussed with regard to FIG. 8B, Channel 23 carries data and some control commands. In addition, hardwired controls are represented by line 25 in FIGS. 8 and 11. The versatility of the modularization of the scanner and printer and the fact that they have a scanner/printer interface separate from the system/communications interface with the system of FIG. 8A is shown in FIG. 12. FIG. 12 maybe connected directly to FIG. 8A at channels 22 and 30. In effect, multiple I/O Adapters (configured as shown in FIG. 8B) maybe added and multiple configurations of scanners and printers or scanner/printer combinations maybe added to channels 22 and 30.

I/O Adapter 210 in FIG. 12 connects a separate scanner 212 and printer 214 to channels 22 and 30. The scanner 212 would be configured as represented by the dashed lines 312B in FIG. 11 while the printer would be configured as represented by dashed lines 312B in FIG. 11. I/O Adapter 216 connects multiple scanners to the control channel 22 and the data channel 30. I/O Adapter 218 provides the interface to the most typical implementation, a single scanner/printer as shown in FIG. 11 attached to channels 22 and 30. Finally, I/O Adapter 220 connects multiple printers to the control channel 22 and the data channel 30.

There are two interfaces between the scanners and printers and CPU 20 or peripheral processing controller 10 (FIG. 8A). Further each of the scanners, printers or scanner/printer combinations have their own supervisory processor. The interface between the I/O Adapters and the CPU 20 and Peripheral Controller 10 have already been described relative to FIGS. 8A, 8B, 9, and 10. The interface between I/O Adapters and the scanners and printers can be understood now by referring to FIGS. 13 and 14 FIG. 13 shows the adapter for the scan control 202 (FIG. 11). FIG. 14 shows the adapter for the printer control 198 (FIG. 11) respectively. The scanner and printer adapters in FIGS. 13 and 14 are very similar. Both adapters have registers and latches that are written into or read out of by processor 180 via the Channel 188. The communication between registers or latches and processor 180 is controlled by command decodes 222 and 224 in FIGS. 13 and 14 respectively.

When the processor 180 wishes to communicate with a latch or register it generates the appropriate I/O enable signal, the appropriate read/write condition and the appropriate address. These inputs are decoded by Decoder 222 or 224 into commands 0-12. Commands 0-4 in FIG. 13 from Decoder 222 are used to enable Status Register 226, Tag In Register 228, Data Register 230, Out Latch 232, and Mode Latches 234. Status Register 226 when enabled loads status bits from the scan apparatus. Tag In Register 228 when enabled loads the service in (SVIN) Tag, STATUS IN Tag, or the INTERRUPT Tag all from process 180. Data Register 230 when enabled controls responses from processor 180 which are to be sent back to CPU 20 through the I/O Adapter.

Out Latch 232 when enabled loads a bit indicating processor 180 wishes to send control information back to CPU 20. Out Latch 230 and Data Register 230 work together. To send control information back to CPU 20, Processor 180 first loads the control information into Data Register 230. Then processor 180 sets the Out Latch 232. The Out Latch enables AND 236. When AND 236 next receives the scanner/printer select (S/P SEL) from the I/O Adapter indicating that this particular scanner has been selected, the AND 236 enables Driver 238 to pass the control information from Data Register 230 to the I/O Adapter over channel 23. Eventually this data reaches CPU 20 over Channel 22.

Mode Latches 234 are also set by processor 180. These Mode Latches indicate the line length being processed and indicate whether a scanner/print mode is called for.

The Command Decode 222 also generates the commands CD 5-12, which are used to select the signal passed by MUX 240 back to processor 180. When the processor 180 wishes to read information it also enables AND 242 by providing the IONBL and the RD signals. AND 242 then enables Driver 244 to pass the output selected by MUX 240 back to processor 180 over Channel 188. The information passed by MUX 240 is status information from Register 226. The control line signals Service Out (SVOUT), Acknowledge (ACK), Command Out (CDOUT), Scanner/Printer Select (S/P SEL), WAIT, or control information over Channel 23. Processor 180 can read these inputs on a cyclic basis to check for thier presence.

A small portion of the scan control 222 (FIG. 11) is included with the adapter in FIG. 13. This portion is the portion that deserializes the scan data. Scan data is received by In buffer 246, it is transferred as an 8 bit byte to OUT buffer 248. From OUT buffer 248, the byte of scan data is passed to the I/O Adapter via channel 23.

The control of the IN and OUT buffers is provided by buffer service logic 250. In operation, the buffer service logic is clocked by a scan clock signal associated with scanner. From the scan clock signal a bit clock corresponding to the scan data rate is used to load the scan data bit by bit serially into buffer 246. After eight scan clock pulses have been counted by the service logic 250, it generates a load command for buffer 248 and transfers the contents of buffer 246 to buffer 248. After buffer 248 has been filled with a byte of scan data, the buffer Service Logic generates an out signal to enable AND 252. AND 252 is enabled by the out signal, the scan condition from mode latches 234 and the scanner select signal from I/O Adapter (FIG. 8). AND 252 enables driver 254 to pass the byte of scan data out on channel 23 to the I/O Adapter.

The scanner select signal also enables driver 256. Driver 256 will pass the Service In (SVIN) signal and the INTERRUPT signal when they are generated by the buffer serivce logic. These signals may also be generated by processor 180 and pass through the TAG IN register 228. The scanner select signal also enables driver 258 to pass these signals back to the I/O Adapter (FIG. 8).

The WAIT signal is also an input to the buffer service logic 250. The WAIT signal might occur if the facsimile system is not ready to receive scan data. This condition stops the loading of buffers 246 and 248. WAIT is also passed to processor 180 to notify the processor of the condition.

The print control adapter in FIG. 14 operates in substantially the same manner as the scan control adapter in FIG. 13. The elements providing the same function in FIG. 14 as FIG. 13 have the same reference numerals with the suffix A added and will not be further detailed here. The main difference between FIG. 13 and FIG. 14 is in the processing of the video data.

In FIG. 14, the video data is received as a byte of eight bits over channel 23 and is serialized into the print data. Bytes of print data over channel 23 are loaded alternately into buffer A and buffer B. Buffer service logic generates the alternate load signals. Buffer serivce logic 260 then selects the buffer previously loaded by switching switch 262. A clock signal derived from the print clock signal is then used to clock or gate that buffer's data out serially as a print data.

The buffer service logic generates the service in (SVIN) signal when it wishes to receive print data from the I/O adapter. A Service Out (SVOUT) signal indicates that the I/O adapter has sent print data. The buffer service logic also receives the WAIT signal from the I/O adapter if for some reason print data cannot be sent. Mode latches 234A setup the buffer service logic with line length information. The mode latches also provide the print condition which enables AND 252A. The other enable condition for AND 252A is the printer select signal. AND 252A then enables driver 264 to pass the SVIN signal. The SVIN signal can also be generated by processor 180 and passed through TAG IN register 228A and driver 258A.

The sequence of operations for the scanner/printer adapters of FIGS. 13 and 14, can be divided into a command sequence, a data transfer sequence, and a termination sequence.

In the command sequence, the scanner/printer select (S/P SEL) signal comes over from the I/O adapter of FIG. 8. Shortly thereafter, the command word or control information appears on channel 23. Immediately thereafter, the command out (CDOUT) signal comes over from the I/O adapter. The processor is monitoring for the S/P SEL signal and CDOUT signal via MUX 240A. When the CDOUT signal is detected by processor 180, it selects MUX 240A to pass the control information from channel 23 to processor 180 via channel 188. Processor 180 then responds by loading status information or control information into the data register 230 or 230A (depending whether the scan or print adapter has been selected) and sets the OUT latch 232 or 232A. Next, the processor loads the TAC IN register 228 or 228A with the STATUS IN signal which is passed back to CPU 20 through the I/O adapter. CPU 20 responds by clearing the command from the bus and dropping CDOUT and then by raising the SVOUT signal after reading the status. When processor 180 receives the SVOUT signal via MUX 240 or 240A, it drops the STATUS IN signal so that CPU 20 knows its response was acknowledged and resets the OUT latch. CPU 20 then drops the SVOUT signal and the command sequence is complete.

In scan data transfer operations, processor 180 conditions mode latches 234 to enable AND 252 to put the scan data on the channel 23. Then buffer service logic 250 sends a SVIN signal to the I/O adapter via driver 256. The data transfer control logic 152 (FIG. 8) responds with the SVOUT signal indicating that it is capturing the data. When the SVOUT signal is received by buffer service logic 250, it drops the SVIN signal. This signals the I/O adapter that it knows that the data byte was received. The data transfer control logic 152 then drops the SVOUT signal and this completes the transfer of a byte from the scan control to the I/O adapter. When the buffer service logic 250 sees the SVOUT signal drop, it again raises the SVIN signal to begin the transfer of the next byte of data. Alternatively, if end of line (EOL) condition has been reached, the EOL signal from buffer service logic 250 sets an EOL status bit in status register 226. When processor 180 reads this EOL bit from the status register it raises the INTERRUPT signal. The INTERRUPT signal is passed back through the I/O adapter to CPU 20 to tell the CPU that a line of data has been processed by the scanner.

Data transfer operation in the print control adapter of FIG. 14 is slightly different. When the printer is ready for data, the buffer service logic 260 raises the SVIN signal and passes it via driver 264A to the I/O adapter. The data transfer control logic 152 in the I/O adapter places the data byte on channel 23 and raises the SVOUT signal. When the buffer service logic 260 in FIG. 14 sees the SVOUT signal come up, it drops the SVIN signal to acknowledge to the I/O adapter that it has received the data byte. The data transfer control logic 152 in the I/O adapter then drops the SVOUT signal completing a transfer sequence for print operation. When the buffer service logic 260 sees the SVOUT signal drop, it may begin the next transfer sequence by again raising the SVIN signal. However if logic 260 detects an end of line condition it sets an EOL status bit in status register 226A. When processor 180 reads this EOL bit from the status register it raises the INTERRUPT signal. The INTERRUPT signal is passed back through the I/O adapter to CPU 20 to tell the CPU that a line of data has been processed by the printer.

When an INTERRUPT signal is received by CPU 20 via I/O Adapter of FIG. 8, the CPU responds with an acknowledge (ACK) signal. The acknowledge is received by processor 180 through MUX 240 or 240A. Processor 180 then knows that the CPU 20 is aware that an end of line condition has been reached. Processor 180 drops the INTERRUPT signal, and CPU 20 then drops the ACK signal.

The termination sequence is initiated by the Processor 180. The sequence is similar to the command sequence. The termination sequence will be described in reference to FIG. 13. The operation is identical in FIG. 14. In a termination sequence, the S/P SEL signal is already present. Processor 180 loads status information into the data register 230. Processor 180 then sets the OUT latch 232 so that AND 236 will enable driver 238 to place the status information on the channel 23. Processor 180 also places the STATUS IN signal in the TAG IN register 228. The STATUS IN signal is then passed by driver 258 to the CPU 20 via the I/O Adapter. The CPU 20 responds with a SVOUT signal to acknowledge receipt of the status information. When processor 180 detects the SVOUT signal via MUX 240, it rests the OUT latch and drops the STATUS IN signal. When the CPU 20 sees the STATUS IN signal drop, it acknowledges completion of the termination sequence by dropping the SVOUT out signal. Processor 180 then monitors for the dropping of SVOUT signal to known that the termination sequence is complete. While we have illutrated and described the preferred embodiments of our invention, it is understood that we do not limit ourselves to the precise constructions herein disclosed and the right is reserved to all changes and modifications coming within the scope of the invention as defined in the appended claims.

What is claimed is:

1. A modular processor-controlled facsimile system having a system processor and a scan/print processor, said modular system comprising:

- a scanning module for converting original documents into video data;
- a printing module for printing video data on copy documents;
- said scanning and printing modules having their operations supervised by the scan/print processor dedicated to their control;
- a communication module having multiple communication devices and a memory supervised by the system processor dedicated to the control of the system, said devices processing video data independent of the system processor;
- said communication module passing the video data along a data bus interconnecting said communication devices and said memory;
- adapter means set to a supervisory mode by the system processor for coupling information from the system processor to the scan/print processor during a supervisory mode of operation and set to an automatic mode by the system processor for transferring video data between said scanning and printing modules and said data bus independent of said processors whereby video data processing by said communication devices and said scanning and printing modules proceeds with said memory independent of said processors.

2. The facsimile system of claim 1 wherein:
said multiple communication devices include a data transceiving means and at least one of a data encrypting/decrypting means and a data compressing/decompressing means.

3. The facsimile system of claim 1 and in addition:
a peripheral processing control means in said communications module for controlling the video data flow along the data bus between said multiple communication devices and said memory;
service logic means in said scan and print modules for controlling the video data flow between said scanning and printing modules and said adapter means;
data transfer control means in said adapter means for controlling the video data flow between said data bus and said adapter means.

4. The facsimile system of claim 3 and in addition:
means in said adapter means addressable by the system processor for passing control information between the system processor and said scanning and printing modules;
means in said scan and print modules addressable by the scan/print processor for passing control information between the scan/print processor and said adapter means whereby the system processor and the scan/print processor can exchange control information through said adapter means.

5. The facsimile system of claim 4 wherein:
said peripheral processing control means is addressable by the system processor and is initialized by control information from the system processor to control a predetermined video data processing job by said communication devices and by said scanning and printing modules;
said service logic means and said data transfer control means controlling a video data transfer between the scanning and printing modules and said adapter means after said control means and said scanning and printing modules are initialized by control information from the system processor.

6. In a document distribution system for entering, communicating and printing information in a communication network, a modular document distribution terminal comprising:
- a first module having:
    - a control/data bus for carrying control information and video data;
    - at least one of a scanning means or a printing means connected to said control/data bus;
    - said scanning means for entering coded or noncoded video data into the system;
    - said printing means for printing video data out of the system;
    - a first supervising means for supervising the control of said scanning means or said printing means;
- a second module having:
    - a control bus for carrying control information;
    - a data bus for carrying video data;
    - a memory connected to said data bus;
    - a plurality of logic means connected to said memory over said data bus for processing the video data for communication to another terminal or printing by said printing means;
    - a second supervising means for supervising each of said plurality of logic means via the control bus in order to set up each logic means for processing video data in said memory;
- an I/O adapting means operating in a first mode under control of said first supervising means for passing control information between said second supervising means and said first supervising means over said control bus in said second module and said control/data bus in said first module so that said second supervising means sets up said first module for a scanning or printing operation;
    - said I/O adapting means operating in a second mode independent of said first and second supervising means for passing video data between said scanning means or said printing means and said memory over said control/data bus in said first module and over said data bus in said second module whereby said plurality of logic means and said scanning or printing means process the video data independent of said first or second supervising means.

7. The apparatus of claim 6 and in addition:
means in said scanning means and in said printing means for buffering video data entered or to be printed respectively;
service logic means in said scanning means and in said printing means for controlling the gating of video data between said buffering means and said control/data bus.

8. The apparatus of claim 7 and in addition:
transfer control means in said I/O adapting means for controlling the flow of video data between said control/data bus and said data bus.

9. The apparatus of claim 8 wherein:
said first supervising means enables said service logic means to perform a video data transfer operation;
said second supervising means enables said transfer control means to perform a video data transfer operation whereby video data passes to or from one or more of said scanning means and said printing means via said control/data bus and said data bus.

* * * * *